United States Patent [19]
Woodrow et al.

[11] Patent Number: 5,678,931
[45] Date of Patent: Oct. 21, 1997

[54] HYDRODYNAMICALLY LUBRICATED ECCENTRICALLY ADJUSTABLE BEARING

[75] Inventors: Harold E. Woodrow, Northboro; Terence M. Shore, Princeton, both of Mass.

[73] Assignee: Morgan Construction Company, Worcester, Mass.

[21] Appl. No.: 544,287

[22] Filed: Oct. 17, 1995

[51] Int. Cl.[6] .......................... F16C 23/02; F16C 32/06
[52] U.S. Cl. .......................................... 384/255; 384/114
[58] Field of Search .................................. 384/255, 256, 384/253, 114

[56] References Cited

U.S. PATENT DOCUMENTS

| Re. 28,107 | 8/1974 | Wilson et al. . | |
|---|---|---|---|
| 395,428 | 1/1889 | Dobson | 384/255 |
| 402,726 | 5/1889 | Dobson | 384/255 |
| 1,714,153 | 5/1929 | Bechman . | |
| 2,180,046 | 11/1939 | Gleissner | 384/255 |
| 2,281,875 | 5/1942 | Gleissner | 384/255 X |
| 2,987,096 | 6/1961 | McConnell | 384/255 X |
| 3,453,031 | 7/1969 | Rickley et al. . | |
| 4,371,219 | 2/1983 | Yamane | 384/291 |

FOREIGN PATENT DOCUMENTS

| 0 042 879 | 1/1982 | European Pat. Off. . |
|---|---|---|
| 1151897 | 2/1958 | France . |
| 46880 | 5/1889 | Germany . |
| 705 907 | 5/1941 | Germany . |
| 713461 | 10/1941 | Germany . |
| 3530558 | 8/1985 | Germany . |
| 363 533 | 2/1973 | U.S.S.R. . |
| 995 935 | 2/1983 | U.S.S.R. . |

OTHER PUBLICATIONS

"Modern High Speed Rod Mill Development," by Hermes, Robert J. et al., *Iron and Steel Engineer*, Jul. 1969, vol. 46, No. 7, Pittsburgh, PA, U.S.A., pp. 59–72.

*Primary Examiner*—Thomas R. Hannon
*Attorney, Agent, or Firm*—Samuels, Gauthier, Stevens & Reppert

[57] ABSTRACT

A hydrodynamically lubricated assembly is disclosed for adjustably and rotatably supporting the journals of work roll pairs in the housing of a roll stand in a rolling mill. The assembly includes a pair of eccentric sleeves journalled for rotation in the housing. Inner sleeves containing journal bearings are rotatably received in the eccentric sleeves, and the work roll journals are rotatably received in the journal bearings. Hydrodynamic and optionally also hydrostatic fluid supply networks communicate with the journal/bearing interfaces via radial conduits in the inner sleeves and journal bearings. The inner sleeves are anchored against rotation, and the eccentric sleeves are rotatable to adjust the parting between the work rolls.

11 Claims, 4 Drawing Sheets

HYDRODYNAMICALLY LUBRICATED ECCENTRICALLY ADJUSTABLE BEARING

BACKGROUND OF THE INVENTION

1. Field of the Invention

This invention relates to the roll stands of a rolling mill, and is concerned in particular with an improved arrangement for adjustably supporting hydrodynamically lubricated work roll bearings.

2. Description of the Prior Art

In the conventional rolling mill roll stand, it is known to employ rotatable sleeves eccentrically bored to receive the journal bearings of work roll pairs. Oil inlet passageways extend radially through the eccentric sleeves and journal bearings, and serve to admit a constant flow of low pressure oil to the journal/bearing interfaces at locations outside the bearing load zones. The thus admitted oil is entrained into high pressure hydrodynamic films on which the work roll journals are supported at the load zones.

A disadvantage of this arrangement stems from the need to maintain the low pressure inlet passageways outside of the high pressure load zones. This imposes severe limitations on the permissible extent of eccentric sleeve rotation, which in turn limits the available range of roll parting adjustment. As a practical matter, eccentric sleeve rotation also rules out the option of introducing high pressure oil at fixed locations within the bearing load zones to hydrostatically augment any loss of hydrodynamic support.

A primary objective of the present invention is to substantially increase the extent to which the eccentric sleeves may be rotated without compromising the hydrodynamic lubrication capabilities of the bearing.

A companion objective of the present invention is to accommodate the introduction of high pressure lubricant at fixed location within the bearing load zones, thereby making it possible to hydrostatically augment any loss of hydrodynamic lubrication.

SUMMARY OF THE INVENTION

In accordance with the present invention, a hydrodynamically lubricated assembly is provided for adjustably and rotatably supporting the journals of work roll pairs in the housing of a roll stand in a rolling mill. The journals may be either segment of shafts supporting cantilevered work rolls, or they may comprise the necks of straddle mounted work rolls. The assembly includes outer eccentric sleeves journalled for rotation in the housing and inner sleeves journalled for rotation in the eccentric sleeves and containing cylindrical bearings for the work roll journals. The inner sleeves are anchored against rotation with respect to both the housing and the outer eccentric sleeves. Hydrodynamic and optional hydrostatic lubricant supply conduits extend radially through the inner sleeves and bearings to communicate with the journal/bearing interfaces at optimum locations freed with respect to the bearing load zones, and an adjusting mechanism is provided for rotating the eccentric sleeves to adjust the parting between the work roll journals.

DETAILED DESCRIPTION OF THE PREFERRED EMBODIMENTS

Figure 1:
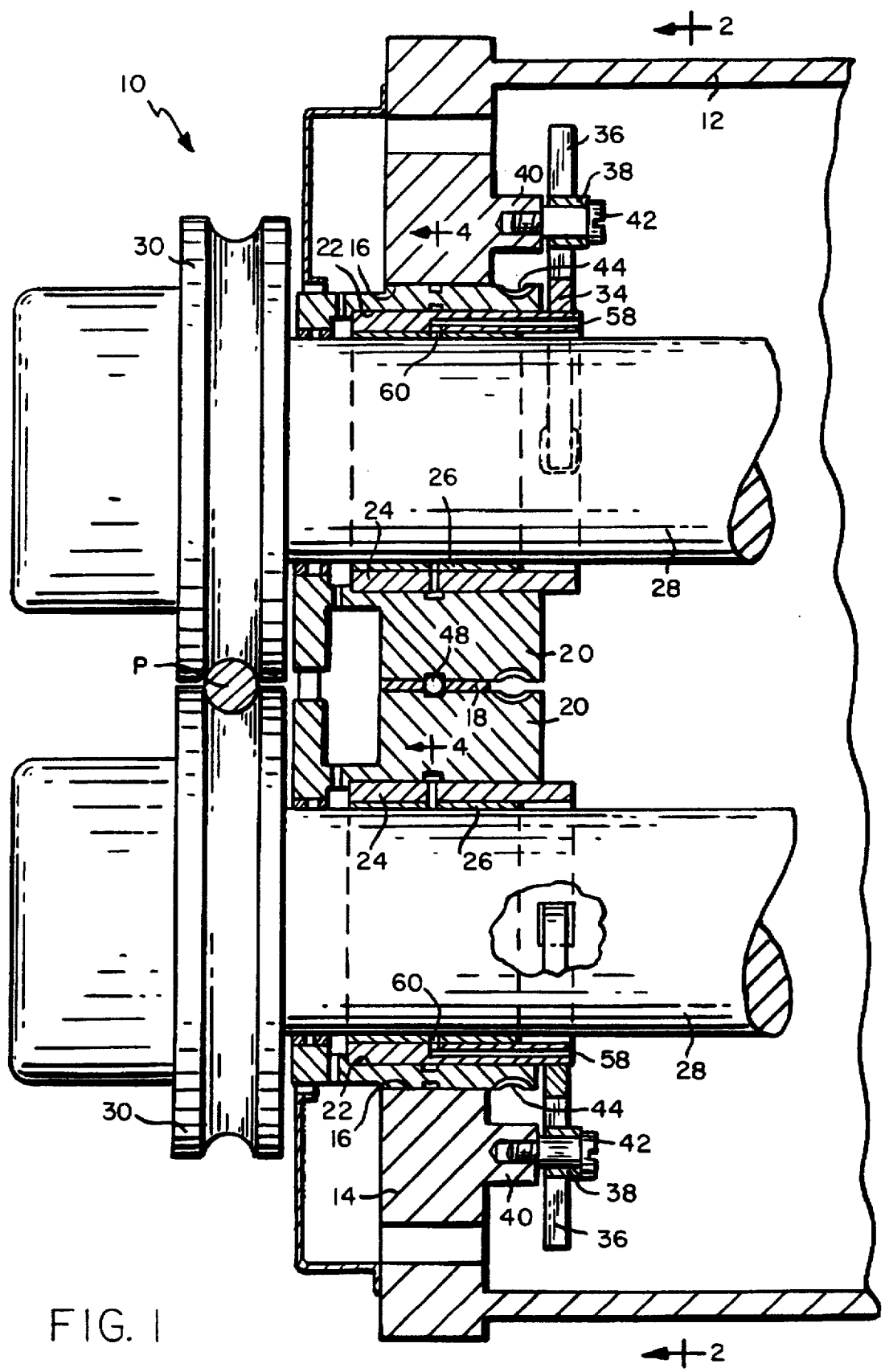
FIG. 1 is a vertical sectional view taken through a cantilevered roll stand in accordance with the present invention.
Figure 2:
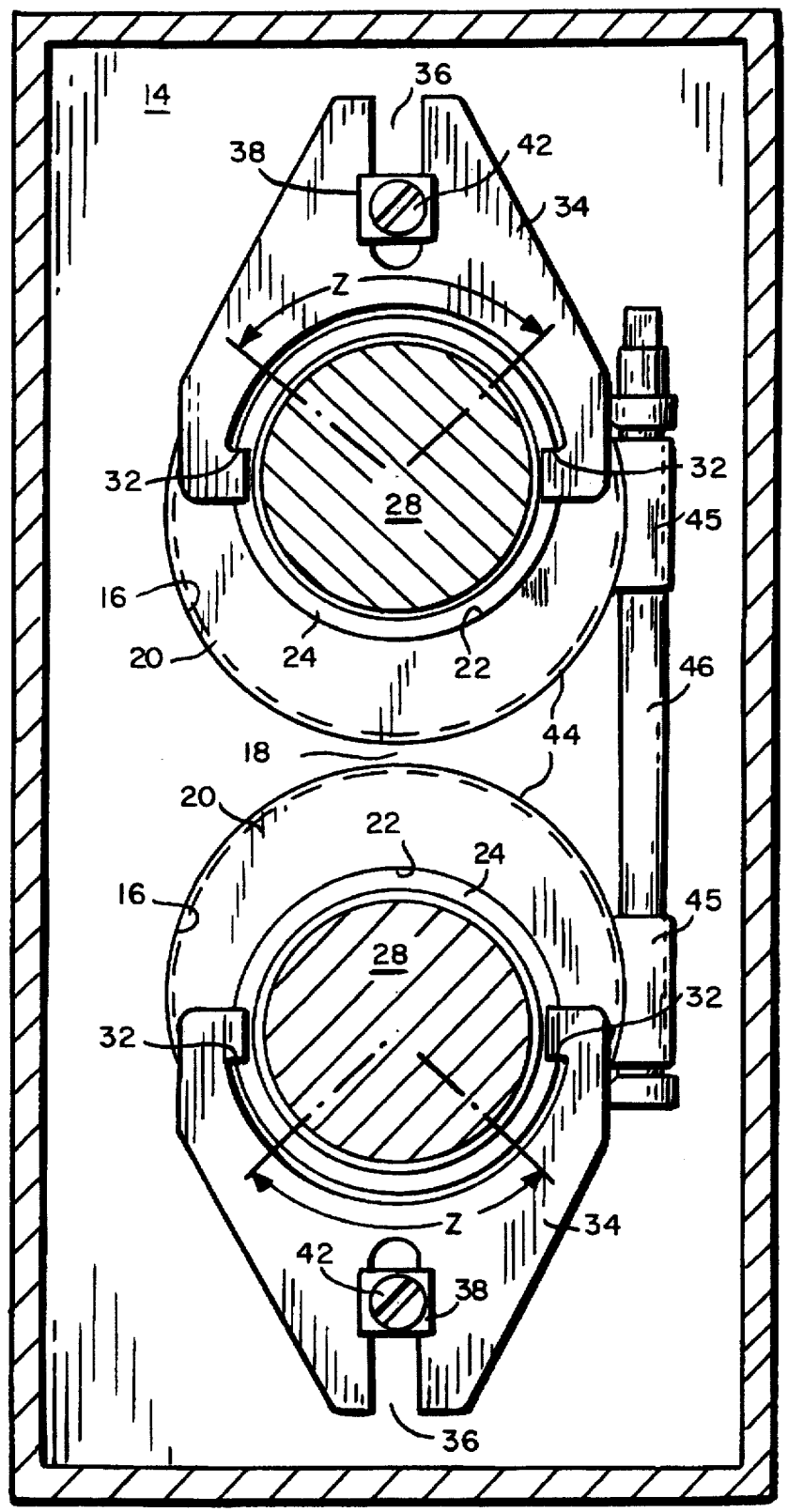
FIG. 2 is a sectional view taken along line 2—2 of FIG. 1.
Figure 3:
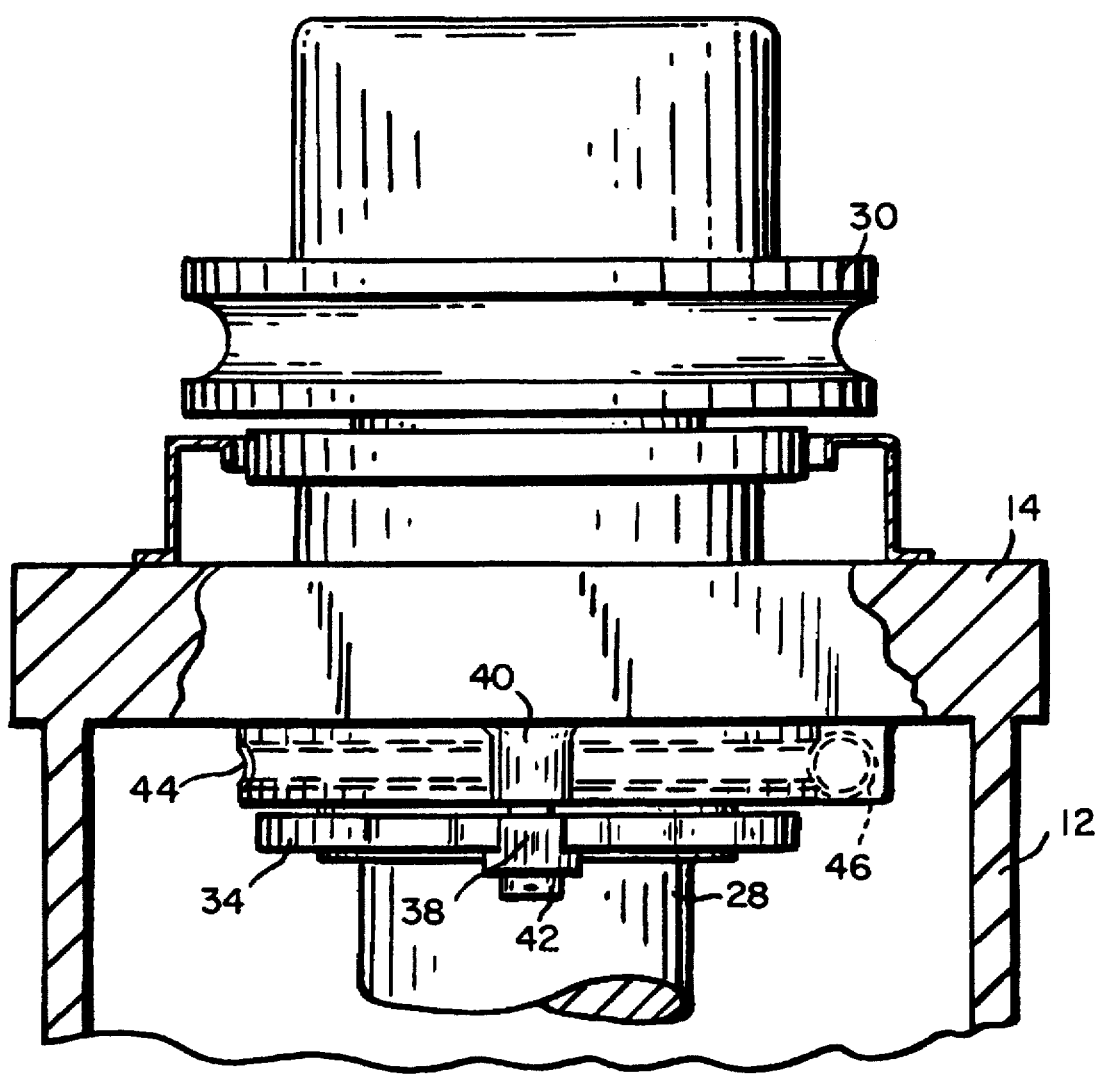
FIG. 3 is a top plan view of the portion of the roll stand shown in FIG. 1.

Referring now to the drawings, the work side of a rolling mill roll stand is shown at 10 as including a housing 12 having a front plate 14 with vertically spaced bores 16 separated by a relatively thin web 18. Outer sleeves 20 are journalled for rotation in the bores 16. The outer sleeves have eccentric bores 22 in which are journalled inner sleeves 24 containing cylindrical journal bearings 26. Roll shafts 28 have journal segments rotatably supported within the bearings 26. The roll shafts protrude from the front plate 14 of the housing 12 and carry grooved work rolls 30 which define a roll pass therebetween. During a rolling operation, the separating forces generated by a product "P" passing between the work rolls 30 are absorbed by the housing front plate 14 at bearing load zones "Z".

The inner sleeves 24 protrude into the interior of the housing 12 and are provided with notches 32 engaged by the jaws of spanner links 34. The spanner links are slotted as at 36 to accommodate slider blocks 38, which in turn are fixed to internal housing bosses 40 by means of shoulder screws 42.

The eccentric sleeves 20 also protrude into the interior of the housing, and are provided with gear teeth 44 meshing with opposite hand worms 45 on a spindle 46.

Figure 4:
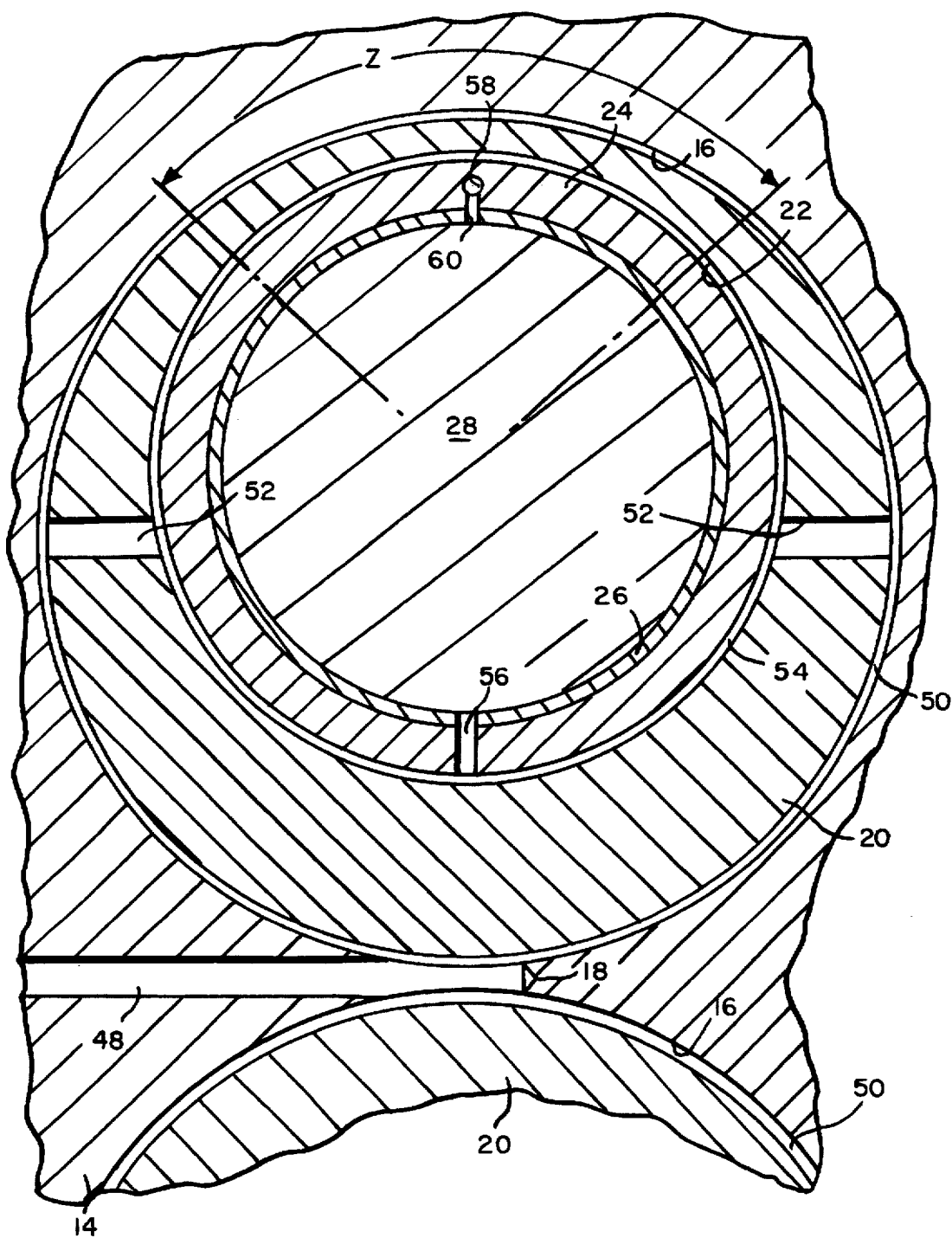
FIG. 4 is an enlarged sectional view taken along line 4—4 of FIG. 1.

As can best be seen in FIG. 4, the housing front plate 14 has a feed passageway 48 for low pressure hydrodynamic oil leading to the relatively thin web 18 separating the bores 16. The eccentric sleeves 20 have external grooves 50 which communicate with both the feed passageway 48 in the housing front plate 14 and passageways 52 extending radially through the eccentric sleeves. The inner sleeves 24 have external grooves 54 which communicate with both the radial passageways 52 in the eccentric sleeves, and radial passageways 56 extending through both the inner sleeves 24 and the bearings 26 at locations disposed 180° from the centers of the load zones Z. The oil admitted via the network of grooves and passageways 48, 50,52, 54 and 56 is hydrodynamically entrained into high pressure films supporting the roll shafts at the bearing load zones Z.

The bearing sleeves 24 optionally may be provided with passageways 58 parallel to the shaft axes which communicate with radial passageways 60 located at the centers of the load zones Z. Passageways 58, 60 serve to admit high pressure oil to hydrostatically augment any loss of hydrodynamic support for the roll shafts, e.g., during low speed start-up conditions or in the event of a disruption of the hydrodynamic oil supply.

In light of the foregoing, it will now be appreciated by those skilled in the art that by rotating spindle 46, the eccentric sleeves 20 will be rotated simultaneously in opposite directions to thereby adjust the parting between the work rolls 30. However, the inner sleeves 24 will be anchored against rotation by virtue of their mechanical interconnection to the housing 12 via the spanner links 34. Thus, the hydrodynamic and hydrostatic inlet passageways 56, 60 remain substantially stationary and unaffected by eccentric; sleeve rotation. It is therefore possible to take full advantage of the eccentric sleeves by rotating them up to 180° in order to achieve the maximum available range of roll parting adjustments.

Although not illustrated in the drawings, it will be understood that a similar assembly of eccentric sleeves, bearing sleeves, spanners, etc. is provided in a rear housing plate to maintain the roll shafts 28 in parallel alignment.

Those skilled in the art will appreciate that various changes and modifications may be made to the above described embodiment without departing from the spirit and scope of the appended claims. For example, the inner bearing sleeves 24 may be anchored against rotation by other equivalent mechanisms, including guide bars interconnecting the inner bearing sleeves. Hydrostatic lubrication is an optional feature. Essentially the same components may be employed to rotatably and adjustably support the roll necks of straddle mounted rolls.

We claim:

1. A hydrodynamically lubricated assembly for adjustably and rotatably supporting the journals of work roll pairs in the housing of a roll stand in a rolling mill, said assembly comprising:

a pair of outer sleeves journalled for rotation in said housing, said outer sleeves having eccentric bores;

inner sleeves containing journal bearings, said inner sleeves being journalled for rotation in said eccentric bores and said work roll journals being rotatably received in and being supported by said journal bearings at bearing load zones;

anchor means for opposing rotation of said inner sleeves with respect to both said outer sleeves and said housing;

means for adjustably rotating said outer sleeves with respect to both said housing and said inner sleeves to thereby adjust the parting between said work roll journals;

hydrodynamic inlets extending radially through said inner sleeves and said journal bearings to communicate with the interface between said journal bearings and said work roll journals at locations outside of said bearing load zones; and hydrodynamic conduit means for continuously supplying lubricant to said interfaces via said hydrodynamic inlets irrespective of the rotational orientation of said outer sleeves.

2. The assembly of claim 1 further comprising hydrostatic inlets extending radially through said journal bearings and communicating with the interfaces between said journal bearings and said journals at said load zones; and hydrostatic conduit means for supplying lubricant to said load zones via said hydrostatic inlets.

3. The assembly of claim 1 wherein said anchor means establishes a mechanical connection between said inner sleeves and said housing.

4. The assembly of claim 3 wherein said anchor means comprises levers extending radially from said inner sleeves and having ends slidably engageable with fixed elements on said housing.

5. The assembly of claim 3 wherein said anchor means comprises spanner links having jaws at one end engageable with said inner sleeves and having opposite ends slidably engageable with fixed elements on said housing.

6. The assembly as claimed in claim 1 wherein the lubricant supplied via said hydrodynamic inlets is formed into hydrodynamic films on which said journals are supported at said load zones.

7. The assembly of claim 6 wherein said hydrodynamic inlets are maintained at approximately 180° from of said load zones.

8. The assembly of claim 1 wherein said hydrodynamic conduit means comprises inner conduits encircling said inner sleeves at the interfaces between said inner sleeves and said eccentric bores, said hydrodynamic inlets being in communication with said inner conduits; outer conduits encircling said outer sleeves, said outer conduits being located at the interfaces between said outer sleeves and said housing and being in communication with a lubricant supply; and intermediate conduits extending radially through said outer sleeves to connect said inner conduits to said outer conduits.

9. The assembly of claim 8 wherein said inner conduits are defined at least in part by circular inner grooves in one of the surfaces at the interfaces between said inner sleeves and the eccentric bores of said outer sleeves.

10. The assembly of claim 9 wherein said outer conduits are defined at least in part by circular outer grooves in one of the surfaces at the interfaces between said outer sleeves and said housing.

11. The assembly of claim 9 wherein said inner and outer grooves are arranged in common planes and connected by at least one passageway extending radially through each of said outer sleeves.

* * * * *